United States Patent
Sankaran et al.

(10) Patent No.: US 8,706,923 B2
(45) Date of Patent: Apr. 22, 2014

(54) METHODS AND SYSTEMS FOR DIRECT MEMORY ACCESS (DMA) IN-FLIGHT STATUS

(75) Inventors: Jagadeesh Sankaran, Allen, TX (US); Jeremiah E. Golston, Plano, TX (US)

(73) Assignee: Texas Instruments Incorported, Dallas, TX (US)

( * ) Notice: Subject to any disclaimer, the term of this patent is extended or adjusted under 35 U.S.C. 154(b) by 115 days.

(21) Appl. No.: 12/881,614

(22) Filed: Sep. 14, 2010

(65) Prior Publication Data
US 2012/0066415 A1  Mar. 15, 2012

(51) Int. Cl.
*G06F 13/28* (2006.01)

(52) U.S. Cl.
USPC .............................. 710/23; 710/22

(58) Field of Classification Search
None
See application file for complete search history.

(56) References Cited

U.S. PATENT DOCUMENTS

| | | | |
|---|---|---|---|
| 5,943,507 A * | 8/1999 | Cornish et al. | 710/48 |
| 6,704,863 B1 * | 3/2004 | Paul et al. | 712/244 |
| 6,868,457 B2 * | 3/2005 | Matsui | 710/22 |
| 2006/0080478 A1 * | 4/2006 | Seigneret et al. | 710/22 |
| 2007/0153091 A1 * | 7/2007 | Watlington et al. | 348/208.14 |
| 2007/0234117 A1 * | 10/2007 | Elliott et al. | 714/22 |
| 2010/0161846 A1 * | 6/2010 | Flachs et al. | 710/22 |

* cited by examiner

*Primary Examiner* — Idriss N Alrobaye
*Assistant Examiner* — Ronald Modo
(74) *Attorney, Agent, or Firm* — Robert D. Marshall, Jr.; W. James Brady; Frederick J. Telecky, Jr.

(57) ABSTRACT

In accordance with at least some embodiments, a system includes a processing entity configured to run multiple threads. The system also includes a direct memory access (DMA) engine coupled to the processing entity, the DMA engine being configured to track DMA in-flight status information for each of a plurality of DMA channels. The processing entity is configured to manage overlapping DMA requests to a DMA channel of the DMA engine based on said DMA in-flight status information.

11 Claims, 3 Drawing Sheets

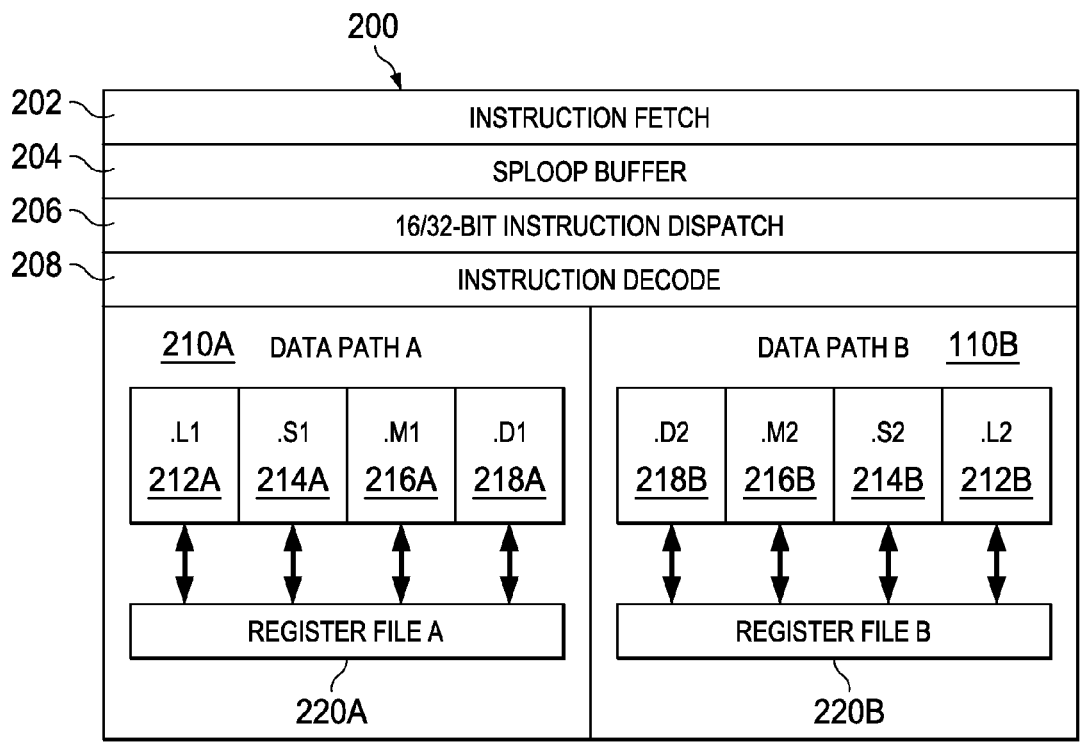
FIG. 2
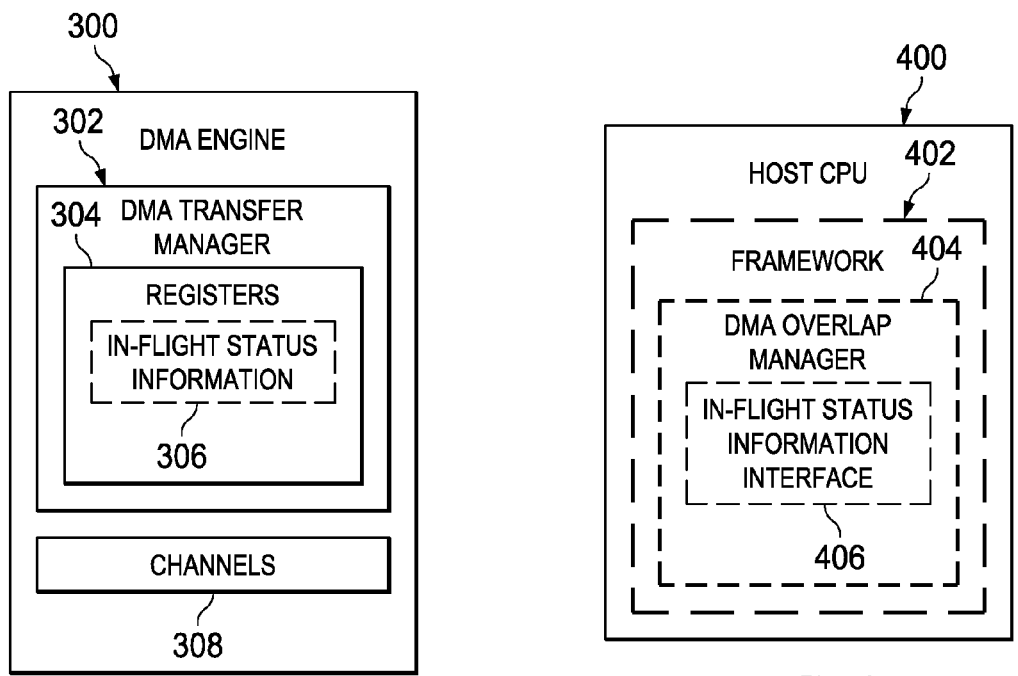
FIG. 3
FIG. 4

METHODS AND SYSTEMS FOR DIRECT MEMORY ACCESS (DMA) IN-FLIGHT STATUS

BACKGROUND

Many embedded systems have a direct memory access (DMA) engine, which enables movement of data between memories with limited or no processor involvement. For example, a processing entity may request that the DMA engine perform a DMA transfer, but does not actually move the data between memories (the DMA engine performs the data move operation). During the movement of data by a DMA engine, a processor entity is able to perform other tasks and thus the efficiency of the embedded system is improved. In embedded systems where a DMA engine is shared by multiple processing entities, the scenario exists where DMA transfers requested by the multiple processing entities and/or multiple algorithms being run on a single processing entity overlap (i.e., a DMA channel is requested before the previous DMA transfer on that same DMA channel is completed). Techniques for managing overlapping DMA transfer requests are needed.

SUMMARY

In accordance with at least some embodiments, a system includes a processing entity configured to run multiple threads. The system also includes a direct memory access (DMA) engine coupled to the processing entity, the DMA engine being configured to track DMA in-flight status information for each of a plurality of DMA channels. The processing entity is configured to manage overlapping DMA requests to a DMA channel of the DMA engine based on the DMA in-flight status information.

In at least some embodiments, a DMA engine shared by a plurality of entities includes a plurality of DMA channels. The DMA engine also includes a DMA transfer manager that selectively allocates DMA channels to received DMA requests and tracks in-flight status information for DMA transfers on each DMA channel.

In at least some embodiments, a method includes tracking, by a central processing unit (CPU), DMA in-flight status information for a DMA channel. The method also includes managing, by the CPU, overlapping DMA requests to the DMA channel based on the DMA in-flight status information.

BRIEF DESCRIPTION OF THE DRAWINGS

For a detailed description of exemplary embodiments of the invention, reference will now be made to the accompanying drawings in which:

FIG. 2 illustrates a digital signal processor (DSP) core architecture in accordance with an embodiment of the disclosure;

FIG. 3 illustrates a DMA engine in accordance with an embodiment of the disclosure;

FIG. 4 illustrates a host central processing unit (CPU) in accordance with an embodiment of the disclosure;

NOTATION AND NOMENCLATURE

Figure 1:
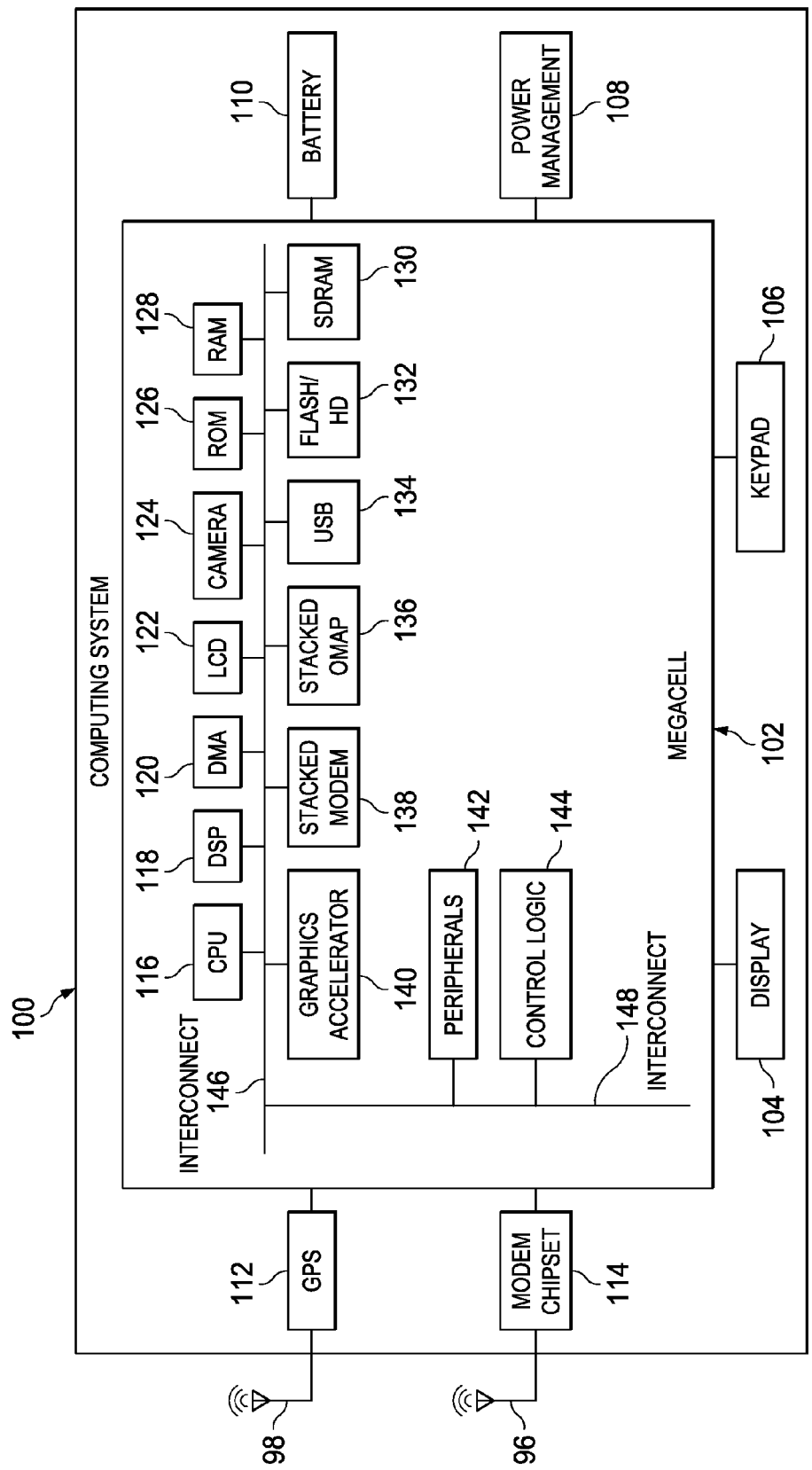
FIG. 1 illustrates a computing system in accordance with an embodiment of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are directed to methods and systems in which direct memory access (DMA) in-flight status information is tracked and utilized to manage overlapping DMA requests to DMA channels. As used herein, the term "in-flight" refers to a stage in a process, such as a DMA transfer, where the process cannot be stopped and has not been completed. The scenario of overlapping DMA request may arise, for example, in an embedded system where there is one DMA engine being shared by multiple processing entities. Additionally or alternatively, a single processing entity may be executing multiple threads that share the DMA engine. As a specific example, MPEG2 and MPEG4 video decoding algorithms may be running concurrently for one frame. Further, another algorithm may be running to display MPEG2 video and MPEG4 video simultaneously on the same display. These algorithms are performed with software threads configured to submit overlapping DMA requests (i.e., DMA requests for the same DMA resources).

Re-assignment of DMA resources (e.g., PARAM's and transfer completion codes (TCCs)) from one algorithm to another in a multi-thread environment facilitates DMA use. As used herein, PARAM's correspond to a region of memory in which attributes of a transfer are described. Additionally or alternatively, PARAM's could be memory mapped registers (e.g., source or destination registers) related to attributes of a DMA transfer. Careful management of the timing of DMA resource re-assignment is needed to prevent errors with overlapping DMA requests. The embodiments disclosed herein are based on the recognition that management of DMA resources using only DMA transfer completion status information is not suitable in a multi-thread environment where overlapping DMA requests are submitted. This is especially the case, where different threads have different priorities. Accordingly, embodiments are configured to manage DMA resources in a multi-thread environment based on DMA in-flight status information in addition to DMA transfer completion status information. In at least some embodiments, a framework or operating system (OS), separate from threads that submit overlapping DMA requests, is able to access DMA in-flight status information and arbitrate between overlapping DMA requests for multiple algorithms with different priorities.

At least some embodiments disclosed herein comprise an Advanced RISC Machine (ARM) processor, a DSP and a DMA engine configured to perform video decoding or other algorithms. As an example, when a video frame is finished, the DSP may check whether all DMA transfers are completed. Until then, a DMA transfer is not preemptable (i.e., the only boundary at which a DMA transfer is preemptable for video frames is frame by frame by frame). When a DMA channel is free, an interrupt may be sent to the ARM and the ARM can allocate another DMA request on that channel. On the other hand, with in-flight information, the ARM can delay when the next algorithm that issues DMA requests should start without waiting for communications from the DSP or the DMA engine.

A hardware control model for a DMA engine may indicate whether a DMA has completed by posting a completion bit in a register. The completion bit can be polled or interrupt driven by either the DSP or a general purpose CPU such as a host ARM. For a software control model of a DMA engine, DMAs may be submitted by the DSP (e.g., for video codes) at the earliest point in time. The DMA transfer is performed in the background while the DSP performs processing on data fetched by previous DMA transfers. In this scenario, polling the completion bit may be implemented asynchronously as DMA is an independent engine. The software control model can optionally be interrupt driven, but this would result in context switch and restore overhead times, and would result in loss of performance. The benefit of polling is that since the DSP schedules the events at the earliest possible time, the DSP is likely to complete its processing (which has been chosen to work on an appropriate granularity so as to sufficiently busy the DSP during this time). Thus, very few cycles are needed to poll the completion register.

However, the completion register can only be used to determine if a DMA that has been submitted has completed or not. In a multi-tasking real-time environment (as found in a video set-top box where multiple tasks run on the same DSP at various priorities), when a task gets preempted (e.g., a framework may invoke the next task or an OS invokes the next task at the highest priority) it is desirable to re-use the PARAMS and the TLC's that were allocated to previous tasks that ran. Co-processors and hardware accelerators also these tend to use DMA resources as well. Monitoring in-flight information as described herein facilitates re-allocation of DMA resources (e.g., for page out persistent and scratch memories) by a framework or OS.

Embodiments of the disclosure are directed to hardware and/or software techniques for tracking and using in-flight DMA transfer information. In a software implementation, an application uses a framework (e.g., XDAIS) to submit DMA requests and scratch and persistent memory requests. The framework determines the number of DMA channels ("N") being requested and allocates N variables, where the application using the DMA can maintain the status of whether a DMA transfer is in flight. A software task that uses DMA may first turn off interrupts and, prior to issuing a DMA, set a "1" in the in-flight status register to indicate that a DMA is in flight. Before checking the DMA completion status register, a software task may be configured to check the in-flight status register (whether the in-flight status bit for this channel is still "1") to determine whether to wait or not. The reason the software task needs to check the in-flight register status is because a framework can pre-empt the software task.

As an example, a framework may pre-empt the software task by first checking the in-flight status bits related to the software task. This same mechanism can also be used to check if any co-processors associated with this software task have any DMA's in flight. If there are DMA's in flight, the framework is able to access transfer completion codes that have been allocated and check whether a transfer completion codes has been posted. In this manner, the framework is able to ensure that a transfer has completed, allowing it to safely page out persistent and scratch memories. The framework also needs to clear out the TCC bit in the CIPR register to enable the next software task to safely re-use the same TCC.

In at least some embodiments, the framework is configured to check the in-flight status of all DMAs, wait for the TCC to post, and clear the CIPR register to set the status of all allocated channels of pre-empted software tasks to 0. Advantageously, the status registers of pre-empted tasks will always be "0" to allow for context switches. Further, a software task may check a DMA_wait status to make sure that the associated DMA transfer has not already been delayed by the framework or OS. A software task can determine the DMA_wait status by checking the in-flight status register and the program flow perspective to determine that a DMA transfer was issued and later pre-empted. In such case, the software task does not need to check and clear associated TCC bits for the corresponding DMA channel. By monitoring the in-flight status of DMA transfers, a framework and OS has complete knowledge of the state of the DMA engine and can safely re-claim persistent memory in complex systems that have a mix of CPU's and co-processors.

FIG. 1 shows a computing system 100 in accordance with at least some embodiments of the invention. The computing system 100 implements monitoring and use of in-flight DMA status information as described herein. Although computing system 100 is representative of an Open Multimedia Application Platform (OMAP) architecture, the scope of disclosure is not limited to any specific architecture. As shown, the computing system 100 contains a megacell 102 which comprises a processor core 116 (e.g., an ARM core) and a digital signal processor (DSP) 118 which aids the core 116 by performing task-specific computations, such as graphics manipulation and speech processing. The megacell 102 also comprises a direct memory access (DMA) engine 120 which facilitates direct access to memory in the megacell 102. The megacell 102 further comprises liquid crystal display (LCD) logic 122, camera interface 124, read-only memory (ROM) 126, random-access memory (RAM) 128, synchronous dynamic RAM (SDRAM) 130 and storage (e.g., flash memory or hard drive) 132. The megacell 102 may further comprise universal serial bus (USB) logic 134 which enables the system 100 to couple to and communicate with external devices. The megacell 102 also comprises stacked OMAP logic 136, stacked modem logic 138, and a graphics accelerator 140 all coupled to each other via an interconnect 146. The graphics accelerator 140 performs necessary computations and translations of information to allow display of information, such as on display 104. Interconnect 146 couples to interconnect 148, which couples to peripherals 142 (e.g., timers, universal asynchronous receiver transmitters (UARTs)) and to control logic 144.

In accordance with at least some embodiments of the invention, the computing system 100 may be a mobile (e.g., wireless) computing system such as a cellular telephone, personal digital assistant (PDA), text messaging system, and/or a computing device that combines the functionality of a messaging system, PDA and a cellular telephone. Thus, some embodiments may comprise a modem chipset 114 coupled to an antenna 96 and/or global positioning system (GPS) logic 112 likewise coupled to an antenna 98.

The megacell 102 further couples to a battery 110 which provides power to the various processing elements. The battery 110 may be under the control of a power management unit 108. In some embodiments, a user may input data and/or messages into the computer system 100 by way of the keypad 106. Because many cellular telephones also comprise the capability of taking digital still and video pictures, in some embodiments, the computer system 100 may comprise a camera interface 124 which enables camera functionality. For example, the camera interface 124 may enable selective charging of a charge couple device (CCD) array (not shown) for capturing digital images.

Much of the discussion herein is provided in the context of a mobile computing system 100. However, the discussion of the various systems and methods in relation to a mobile computing environment should not be construed as a limitation as to the applicability of the systems and methods described herein to just mobile computing environments. In accordance with at least some embodiments of the invention, many of the components illustrated in FIG. 1, while possibly available as individual integrated circuits, preferably are integrated or constructed onto a single semiconductor die. Thus, the core 116, the DSP 118, DMA 120, camera interface 124, ROM 126, RAM 128, SDRAM 130, storage 132, USB logic 134, stacked OMAP 136, stacked modem 138, graphics accelerator 140, control logic 144, along with some or all of the remaining components, preferably are integrated onto a single die, and thus may be integrated into the computing device 100 as a single packaged component. Having multiple devices integrated onto a single die, especially devices comprising core 116 and RAM 128, may be referred to as a system-on-chip (SoC) or a megacell 102. While using a SoC is preferred is some embodiments, obtaining benefits of on-demand predication register allocation as described herein does not require the use of a SoC.

In at least some embodiments, the DSP 118 comprises the very-long instruction word (VLIW) DSP architecture 200 shown in FIG. 2. The DSP architecture 200 corresponds to the C64x+™ DSP core, but may also correspond to other DSP cores as well. As shown in FIG. 2, the DSP core architecture 200 comprises an instruction fetch unit 202, a software pipelined loop (SPLOOP) buffer 204, a 16/32-bit instruction dispatch unit 206, and an instruction decode unit 208. The instruction fetch unit 202 is configured to manage instruction fetches from a memory (not shown) that stores instructions for use by the DSP core architecture 200. The SPLOOP buffer 204 is configured to store a single iteration of a loop and to selectively overlay copies of the single iteration in a software pipelined manner. The 16/32-bit instruction dispatch unit 206 is configured to split the fetched instruction packets into execute packets, which may be one instruction or multiple parallel instructions (e.g., two to eight instructions). The 16/32-bit instruction dispatch unit 206 also assigns the instructions to the appropriate work units described herein. The instruction decode unit 208 is configured to decode the source registers, the destination registers, and the associated paths for the execution of the instructions in the work units described herein.

In accordance with C64x+ DSP core embodiments, the instruction fetch unit 202, 16/32-bit instruction dispatch unit 206, and the instruction decode unit 208 can deliver up to eight 32-bit instructions to the work units every CPU clock cycle. The processing of instructions occurs in each of two data paths 210A and 210B. As shown, the data path A 210A comprises work units, including a L1 unit 212A, a S1 unit 214A, a M1 unit 216A, and a D1 unit 218A, whose outputs are provided to register file A 220A. Similarly, the data path B 210B comprises work units, including a L2 unit 212B, a S2 unit 214B, a M2 unit 216B, and a D2 unit 218B, whose outputs are provided to register file B 220B.

In accordance with C64x+ DSP core embodiments, the L1 unit 212A and L2 unit 212B are configured to perform various operations including 32/40-bit arithmetic operations, compare operations, 32-bit logical operations, leftmost 1 or 0 counting for 32 bits, normalization count for 32 and 40 bits, byte shifts, data packing/unpacking, 5-bit constant generation, dual 16-bit arithmetic operations, quad 8-bit arithmetic operations, dual 16-bit minimum/maximum operations, and quad 8-bit minimum/maximum operations. The S1 unit 214A and S2 unit 214B are configured to perform various operations including 32-bit arithmetic operations, 32/40-bit shifts, 32-bit bit-field operations, 32-bit logical operations, branches, constant generation, register transfers to/from a control register file (the S2 unit 214B only), byte shifts, data packing/unpacking, dual 16-bit compare operations, quad 8-bit compare operations, dual 16-bit shift operations, dual 16-bit saturated arithmetic operations, and quad 8-bit saturated arithmetic operations. The M1 unit 216A and M2 unit 216B are configured to perform various operations including 32×32-bit multiply operations, 16×16-bit multiply operations, 16×32-bit multiply operations, quad 8×8-bit multiply operations, dual 16×16-bit multiply operations, dual 16×16-bit multiply with add/subtract operations, quad 8×8-bit multiply with add operation, bit expansion, bit interleaving/de-interleaving, variable shift operations, rotations, and Galois field multiply operations. The D1 unit 218A and D2 unit 218B are configured to perform various operations including 32-bit additions, subtractions, linear and circular address calculations, loads and stores with 5-bit constant offset, loads and stores with 15-bit constant offset (the D2 unit 218B only), load and store doublewords with 5-bit constant, load and store nonaligned words and doublewords, 5-bit constant generation, and 32-bit logical operations. Each of the work units reads directly from and writes directly to the register file within its own data path. Each of the work units is also coupled to the opposite-side register file's work units via cross paths. For more information regarding the architecture of the C64x+ DSP core and supported operations thereof, reference may be had to Literature Number: SPRU732H, "TMS320C64x/C64x+ DSP CPU and Instruction Set", October 2008, which is hereby incorporated by reference herein.

In relation to in-flight status of DMA transfers as disclosed, the DSP architecture 200 is configured to wait on the channels for which there are in-flight transfers to complete. The DSP architecture 200 then captures the status of all completed transfers into some persistent memory for reference. In some embodiments, completed transfers can be cleared and the same resources are re-used in the next thread to be run. Prior to resuming a pre-empted thread, the DSP architecture 200 may update the status of all completed transfers since the pre-empted thread will resume and make sure that transfers it completed have finished. Alternatively, code for DSP architecture 200 may be written to wait on transfers, only if pre-emption has not occurred. Without this technique pre-emptions are possible only at fixed boundaries such as a video frame or audio frame. However, in a system with multiple entities and multiple threads with different priorities, pre-emptions at arbitrary times enable improved processing and transfers. As an example, being able to pre-empt at the end of every row of macroblocks in a video encoder could leverage the disclosed techniques.

FIG. 3 illustrates a DMA engine 300 in accordance with an embodiment of the disclosure. The DMA engine 300 may correspond, for example, to the DMA engine 120 of FIG. 1. As shown, the DMA engine 300 comprises a DMA transfer manager 302 with registers 304 to store in-flight status information 306. The DMA engine 300 also comprises channels 308 that are assignable upon request entities that request DMA transfers. In operation, the DMA transfer manager 302 selectively allocates DMA channels 308 to received DMA requests and tracks the in-flight status information 306 for DMA transfers on each DMA channel 308. In at least some embodiments, the DMA transfer manager 302 is configured to store the in-flight status information 306 for DMA transfers in a predetermined location designated by each DMA request.

Upon request, the DMA transfer manager 302 is configured to provide some or all of the in-flight status information 306 related to DMA transfers in response to queries from entities (e.g., an ARM, DSP, co-processor, hardware accelerator) of a system or from software tasks being performed by such entities. For example, the in-flight status information may be provided using an interrupt generated by the DMA transfer manager 302, where the interrupt includes in-flight status information for one or more DMA transfers. The generated interrupt may be transmitted, for example, to at least one of the entities of a system in communication with the DMA engine 300.

FIG. 4 illustrates a host central processing unit (CPU) 400 in accordance with an embodiment of the disclosure. The host CPU 400 may correspond, for example, to the CPU 116 of FIG. 1. In at least some embodiments, the host CPU 400 executes a framework 402 having a DMA overlap manager 404. In operation, the framework 402 is able to handle overlapping DMA requests based on the DMA overlap manager 404 accessing in-flight status information for DMA transfers. More specifically, the DMA overlap manager 404 may comprise an in-flight status information interface 406 configured to communicate with DMA engine 300 to access in-flight status information. Rather than maintain the in-flight status information in DMA hardware, the host CPU 400 or system memory mapped registers may maintain the in-flight status information.

Based on in-flight status information accessed by the DMA overlap manager 404, the framework 402 is able to manage multiple DMA requests in an environment where multiple entities or multiple threads may send conflicting DMA requests (i.e., overlapping requests for the same channel). In response to such conflicts, the framework 402 is able to delay or stall a task related to a conflicting DMA request.

Figure 5:
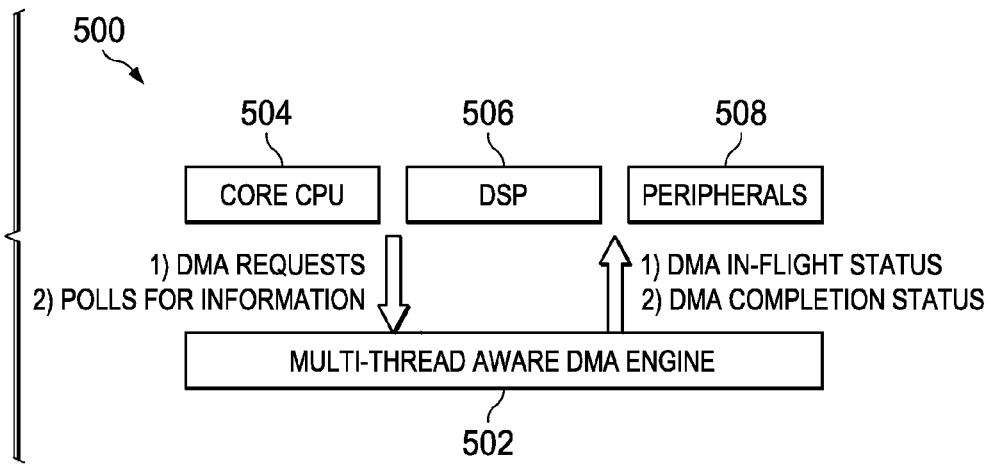
FIG. 5 illustrates a system in accordance with an embodiment of the disclosure.

FIG. 5 illustrates a system 500 in accordance with an embodiment of the disclosure. In system 500, a plurality of entities such as a core CPU 504, a DSP 506 and peripherals 508 are able to submit DMA requests to a multi-thread aware DMA engine 502. The DSP 506 corresponds, for example, to a VLIW DSP such as DSP architecture 200. Meanwhile, the peripherals 508 correspond, for example, to slave peripherals that employ DMA's to transfer captured real-time data to memory. Such peripherals 508 may share an independent and orthogonal set of channels. Sometimes channels are grouped into queues and one can track whether queues are empty or non-empty to allow transfers to complete when pre-emption happens. However, this process is inefficient (increasing task switch time), as one may be waiting on transfers of other peripherals in addition to the CPU.

The core CPU 504, the DSP 506 and/or the peripherals 508 are also able to submit polls for information to the multi-thread aware DMA engine 502. The polls may request DMA in-flight status information and/or DMA completion status information, which are tracked by the multi-thread aware DMA engine 502. In response to such polls, the multi-thread aware DMA engine 502 provides the DMA in-flight status information and/or the DMA completion status information. In some embodiments, an authentication or security scheme may be implemented between entities of system 500 and the multi-thread aware DMA engine 502. In such case, certain entities may be restricted from accessing the DMA in-flight status information and/or the DMA completion information. Entities that are able to access the DMA in-flight status information are able to coordinate conflicting DMA requests (e.g., by delaying or stalling a task) or issuance of new DMA requests based on the DMA in-flight status information. The efficiency of the system 500 is improved over systems that only rely on DMA completion status information because entities are able to use DMA in-flight status information to manage multiple tasks with different priorities. Further, the tracking of DMA in-flight status information and the access of tracked DMA in-flight status information by system entities can be accomplished without adding significant overhead to the system 500.

In at least some embodiments, the core CPU 504 is configured to manage overlapping DMA requests to a DMA channel of the multi-thread aware DMA engine 502 based on DMA in-flight status information for the DMA channel. The overlapping DMA requests may be received from at least one of the core CPU 504, the DSP 506, and the peripherals 508, and are managed by the core CPU 504 based on the DMA in-flight status information. Further, in some embodiments, the DSP 506 may manage its own overlapping DMA requests for a DMA channel based on accessing DMA in-flight status information for the DMA channel.

To facilitate later access to DMA in-flight status information by one or more entities, a DMA request received by the multi-thread aware DMA engine 502 may comprise an instruction to allocate memory for storage of DMA in-flight status information in a predetermined memory location. For example, the in-flight information may be stored in MMR's of the DMA unit, which are accessible to the CPU through regular loads and stores via a system configuration bus For example, a host CPU or DSP may be configured to query the multi-thread aware DMA engine 502 for the DMA in-flight status information using the predetermined memory location. Alternatively, the host CPU and/or the DSP may be configured to receive interrupts from the multi-thread aware DMA engine 502, where the interrupt includes the DMA in-flight status information. With the in-flight status information, the host CPU may pre-empt a pending DMA request with a new DMA request if the DMA in-flight status information indicates the pending DMA request is not in-flight and if the new DMA request is higher priority than the pending DMA request. Further, the host CPU may delay submission of a DMA request until a pending DMA request is completed if the DMA in-flight status information indicates the pending DMA request is in-flight.

Figure 6:
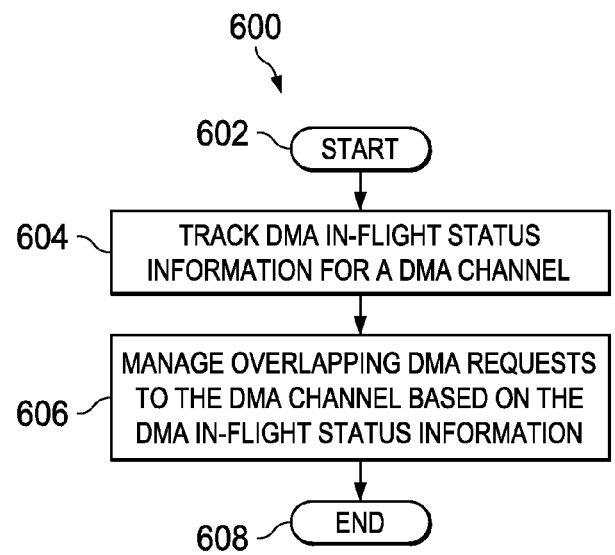
FIG. 6 illustrates a method in accordance with an embodiment of the disclosure.

FIG. 6 illustrates a method 600 in accordance with an embodiment of the disclosure. The method 600 may be performed, for example, by a CPU such as the host processor 400 or core processor 504 described herein. As shown, the method 600 starts at block 602 and continues to block 604 where DMA in-flight status information is tracked for a DMA channel. The method 600 also comprises managing overlapping DMA requests to the DMA channel based on the DMA in-flight status information (block 606) and the method ends at block 608. For example, the managing operation may involve delaying submission of a DMA request until a pending DMA request is completed if the DMA in-flight status information indicates the pending DMA request is in-flight. In some embodiments, the managing operation handles overlapping DMA requests for a digital signal processor (DSP) that concurrently executes a plurality of threads The method 600 may additionally or alternatively detect a priority status for an overlapping DMA request. In such case, the managing operation may pre-empt a pending DMA request with a new DMA request if the DMA in-flight status information indicates the pending DMA request is not in-flight and if the new DMA request is higher priority than the pending DMA request. The method 600 may additionally or alternatively comprise querying a DMA engine to retrieve the DMA in-flight status information. Further, the method 600 may additionally or alternatively comprise or receiving and processing an interrupt with the DMA in-flight status information. Further, the method 600 may additionally or alternatively comprise submitting a DMA request that designates a memory location for the DMA in-flight status information associated with the DMA request.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a processing entity configured to run multiple threads; and a direct memory access (DMA) engine coupled to the processing entity, the DMA engine is configured to track a DMA in flight status bit and a completion bit for each of a plurality of DMA channels, a DMA channel having an in-flight status when it cannot be stopped and has not been completed;
wherein the processing entity is configured to manage overlapping DMA requests to a DMA channel of the DMA engine based on said DMA in-flight status bit and said completion bit for said plurality of DMA channels; and
wherein a DMA request received by the DMA engine comprises an instruction to allocate memory for storage of said DMA in flight status bit in a predetermined memory location, the memory allocated for storage of the DMA in-flight status bit readable by the processing entity via a load instruction and writable by the processing entity via a store instruction.

2. The system of claim 1 further comprising a digital signal processor (DSP) and peripherals coupled to the DMA engine, wherein said overlapping DMA requests to the DMA channel are received from at least one of the processing entity, the DSP, and the peripherals, and are managed by the processing entity based on the DMA in-flight status bit.

3. The system of claim 2 wherein the processing entity and the DSP are configured to query the DMA engine for the DMA in-flight status bit.

4. The system of claim 2 wherein the processing entity and the DSP are configured to receive interrupts from the DMA engine, wherein the interrupt comprises the DMA in-flight status bit indicating whether the corresponding DMA is in-flight or not in-flight.

5. The system of claim 1 wherein the processing entity is configured to read the memory allocated for storage of a pending DMA in-flight status bit, and pre-empt the pending DMA request with a new DMA request if the DMA in-flight status bit indicates the pending DMA request is not in-flight and if the new DMA request is higher priority than the pending DMA request.

6. A direct memory access (DMA) engine shared by a plurality of entities, the DMA engine comprising:
a plurality of DMA channels;
a memory storing an in-flight status bit and a completion bit for each of said DMA channels, a DMA channel having an in-flight status when it cannot be stopped and has not been completed; and
a DMA transfer manager that selectively allocates DMA channels to received DMA requests and tracks said in flight status bit and said completion bit for DMA transfers on each DMA channel, wherein the DMA transfer manager configured to store the in-flight status bit for DMA transfers in a predetermined location designated by each DMA request, the memory allocated for storage of the DMA in-flight status bit readable by a processing entity via a load instruction and writable by the processing entity via a store instruction.

7. The DMA engine of claim 6 wherein the DMA transfer manager is configured to generate an interrupt that includes in-flight status bit for DMA transfers indicating whether the corresponding DMA is in-flight or not in-flight, wherein the interrupt is transmitted to at least one of said entities.

8. A method, comprising:
tracking, by a central processing unit (CPU), a direct memory access (DMA) in-flight status bit and a completion bit for a DMA channel, a DMA channel having an in-flight status when it cannot be stopped and has not been completed;
managing, by the CPU, overlapping DMA requests to the DMA channel based on the DMA in flight status bit and the completion bit of the DMA channel; and
submitting a DMA request that designates a memory location for the DMA in-flight status bit associated with the DMA request, the memory allocated for storing the DMA in-flight status bit readable by a processing entity via a load instruction and writable by the processing entity via a store instruction.

9. The method of claim 8 further comprising:
detecting a priority status for an overlapping DMA request, reading the memory allocated for storage of a pending DMA in-flight status bit, and wherein said managing comprises pre-empting the pending DMA request with a new DMA request if the DMA in-flight status bit indicates the pending DMA request is not in-flight and if the new DMA request is higher priority than the pending DMA request.

10. The method of claim 8 further comprising querying a DMA engine to retrieve the DMA in-flight status bit.

11. The method of claim 8 further comprising receiving and processing an interrupt with the DMA in-flight status bit indicating whether the corresponding DMA is in-flight or not in-flight.

\* \* \* \* \*